3,636,073
Patented Jan. 18, 1972

3,636,073
[4-(2-CYANOVINYL)PHENOXY]ACETIC ACIDS
Edward J. Cragoe, Jr., Lansdale, and Otto W. Woltersdorf, Jr., Chalfont, Pa., assignors to Merck & Co., Inc., Rahway, N.J.
No Drawing. Filed July 3, 1967, Ser. No. 650,648
Int. Cl. A61k 27/00; C07c 121/74
U.S. Cl. 260—465 D         6 Claims

ABSTRACT OF THE DISCLOSURE

[4-(1-alkenyl)phenoxy]alkanoic acid products substituted at the 2-carbon of the alkene chain by one or more radicals selected from cyano, carboxy, alkoxycarbonyl, sulfamoyl, carbamoyl, alkylsulfonyl and arylsulfonyl. The said products are diuretic and saluretic agents which can be used in the treatment of conditions associated with electrolyte and fluid retention. The products of this invention are obtained by treating a nuclear alkanoyl substituted phenoxyalkanoic acid or an ester derivative thereof with a reagent which is capable of replacing the oxygen atom of the alkanoyl group by an alkylidene radical. Suitable reagents include, for example (substituted methylene) triphenylphosphorane and reactive methylene compounds.

This invention relates to a new class of chemical compounds which can be described generally as [4-(1-alkenyl)-phenoxy]alkanoic acid products and to the nontoxic, pharmacologically acceptable salts, esters and amide derivatives thereof.

Also, it is an object of this invention to describe a novel method of preparation for the [4-(1-alkenyl)phenoxy]alkanoic acids, their salts, esters and amides.

Pharmacological studies show that the instant products are effective diuretic and saluretic agents which can be used in the treatment of conditions associated with electrolyte and fluid retention and hypertension. When administered in therapeutic dosages in conventional vehicles the instant products effectively reduce the amount of sodium and chloride ions in the body, lower dangerous excesses of fluid levels to acceptable limits and, in general, alleviate conditions usually associated with edema.

The [4-(1-alkenyl)phenoxy]alkanoic acids of this invention are compounds having the following structural formula:

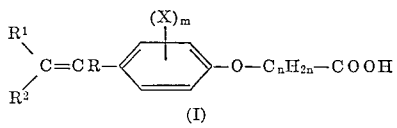

(I)

wherein R is hydrogen or alkyl, for example, lower alkyl such as methyl, ethyl, propyl, etc.; $R^1$ is hydrogen, lower alkanoyl such as acetyl, propionyl, etc., cyano, carboxy, alkoxycarbonyl, for example, lower alkoxycarbonyl, methoxycarbonyl, ethoxycarbonyl, etc., sulfamoyl, carbamoyl, alkylsulfonyl, for example, lower alkylsulfonyl such as methanesulfonyl, ethanesulfonyl, etc. or mononuclear arylsulfonyl such as benzenesulfonyl, etc.; $R^2$ is cyano, alkoxycarbonyl, for example, lower alkoxycarbonyl such as methoxycarbonyl, ethoxycarbonyl, etc., carbamoyl, alkylsulfonyl, for example, lower alkylsulfonyl such as methanesulfonyl, ethanesulfonyl, etc. or mononuclear arylsulfonyl such as benzenesulfonyl, etc.; the X radicals are similar or dissimilar members selected from halogen, for example, chloro, bromo, fluoro, iodo, etc., alkyl, for example, lower alkyl such methyl, etc. and taken together, two X radicals on adjacent carbon atoms of the benzene ring may be joined to form a hydrocarbylene chain (i.e., a divalent organic radical composed solely of carbon and hydrogen) containing from 3–4 carbon atoms between their points of attachment, for example, trimethylene, tetramethylene, 1,3-butadienylene (i.e.,

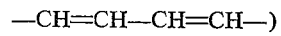

$m$ is an integer having a value of 1–4 and $n$ is an integer having a value of 1–3; and the nontoxic, pharmacologically acceptable acid addition salts, lower alkyl esters, amide, lower alkylamide and di-lower alkylamide derivatives thereof.

A preferred embodiment of this invention relates to the [4-(1-alkenyl)phenoxy]acetic acids having the following structural formula:

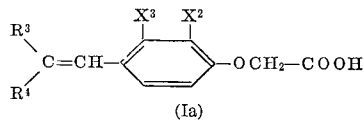

(Ia)

wherein $R^3$ is hydrogen, cyano or lower alkoxycarbonyl, for example, methoxycarbonyl, ethoxycarbonyl, etc.; $R^4$ is cyano or lower alkoxycarbonyl, for example, methoxycarbonyl, ethoxycarbonyl, etc.; and $X^2$ and $X^3$ are similar or dissimilar members selected from halogen, for example, chloro, bromo, fluoro, iodo, etc., lower alkyl, for example, methyl, ethyl, etc. and, taken together, $X^2$ and $X^3$ may be joined to form a 1,3-butadienylene chain. Also included within this subgroup are the salts, lower alkyl esters, amides, lower alkylamides and di-lower alkylamides of the carboxylic acid products. The foregoing class of compounds exhibits particularly good diuretic and saluretic activity and represents a preferred subgroup of compounds within the scope of this invention.

The products (I) of this invention are prepared by the reaction of a nuclear alkanoyl substituted phenoxyalkanoic acid or by the reaction of an ester derivative thereof with a reagent which is capable of replacing the oxygen atom of the nuclear alkanoyl substituent by the alkylidene group $=CR^1R^2$. The choice of a suitable reagent depends largely upon the character of the substituents which are desired on the alkylidene group. For example, those products (I) wherein the alkylidene radical contains two substituents other than hydrogen can be obtained by the reaction of a nuclear alkanoyl substituted phenoxyalkanoic acid, or by the reaction of an esterified derivative thereof, with a suitable disubstituted methylene compound of the formula $R^2CH_2R^6$, wherein $R^2$ is as defined above and $R^6$ is a defined below. The reaction is conducted in the presence of a base such as ammonium acetate, piperidine acetate, etc. and, preferably, with heating as, for example, by heating under reflux. The following equation illustrates this method of preparation employing an ester reactant (II, infra); however, when the corresponding carboxylic acid is used as the starting material the corresponding [4-(1-alkenyl)phenoxy]alkanoic acid product (Ib) is obtained in a single step, thus eliminating the necessity of hydrolyzing the ester intermediate (III, infra) to the carboxylic acid product (Ib):

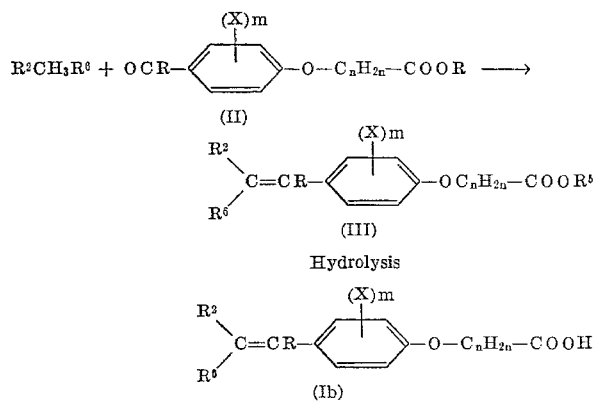

wherein $R^5$ is lower alkyl, $R^6$ is lower alkanoyl, cyano, carboxy, alkoxycarbonyl, sulfamoyl, carbamoyl, alkylsulfonyl or mononuclear arylsulfonyl and R, $R^2$, X, $m$ and $n$ are as defined above.

A second method of preparation and one which is suitable for preparing those [4-(1-alkenyl)phenoxy]alkanoic acid products (I) wherein $R^7$ in the alkylidene group $=CR^7R^8$ is hydrogen or lower alkanoyl and $R^8$ represents cyano, alkoxycarbonyl or carbamoyl consists in treating an appropriate (substituted methylene)triphenylphosphorane (IV, infra) with an ester of a (4-alkanoylphenoxy)alkanoic acid (II, infra) and the [4-(1-alkanyl)phenoxy]alkanoic acid ester intermediate (V, infra) thus obtained is then separated as a product of the invention or, if desired, the said ester may be hydrolyzed by treatment with an aqueous solution of a base and then with an acid to yield the corresponding [4-(1-alkenyl)phenoxy]alkanoic acid (Ic, infra). The following equation illustrates this method of preparation:

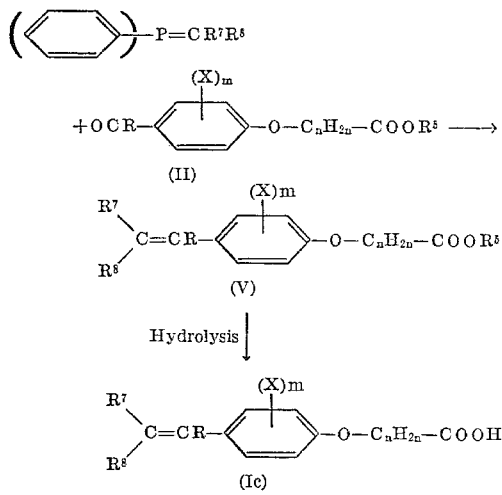

wherein R, $R^5$, $R^7$, $R^8$, X, $m$ and $n$ are as defined above.

The [4-(1-alkenyl)phenoxy]alkanoic acid products (I) of the invention are generally obtained as crystalline solids and may be purified by recrystallization from a suitable solvent or mixtures of solvents. Suitable solvents include, for example, benzene, acetonitrile, acetic acid, carbon tetrachloride, ethanol, toluene, mixtures of ethyl acetate and hexane, etc.

The (4-alkanoylphenoxy)alkanoic acids and their esters employed as starting materials in the foregoing preparative methods are either known compounds or may be prepared by methods which are obvious to those skilled in the art. For example, those reactants wherein the alkanoyl moiety is an acetyl radical or an higher homologous derivative thereof are known compounds which are disclosed in U.S. Pat. No. 3,255,241, issued June 7, 1966. However, the (4-formylphenoxy)alkanoic acids and their esters are, in general, novel compounds which may be synthesized by several alternate routes: (a) by the etherification of a nuclear hydroxy substituted benzaldehyde or (b) by the formylation of a phenoxyalkanoic acid.

The etherification process (a) for the preparation of the (4-formylphenoxy)alkanoic acid reactants and their corresponding ester derivatives consists in treating a suitable nuclear hydroxy substituted benzaldehyde (VI, infra) with an haloalkanoic acid ester in which the alkylene chain is either a methylene or trimethylene radical; and the (4-formylphenoxy) alkanoic acid ester (IIa, infra) thus obtained may then be isolated for use as a reactant in one of the two principal methods of this invention or, if desired, the said ester may be hydrolyzed in the conventional manner by treatment with an aqueous solution of an acid or a base to yield the corresponding (4-formylphenoxy)alkanoic acid (IIb, infra). The etherification reaction is conducted in the presence of a base and, preferably, at temperatures above ambient temperature. Suitable bases which may be employed in the process include, for example, sodium or potassium carbonate, sodium or potassium hydroxide or a sodium alcoholate such as sodium ethoxide. The following equation illustrates this method of preparation:

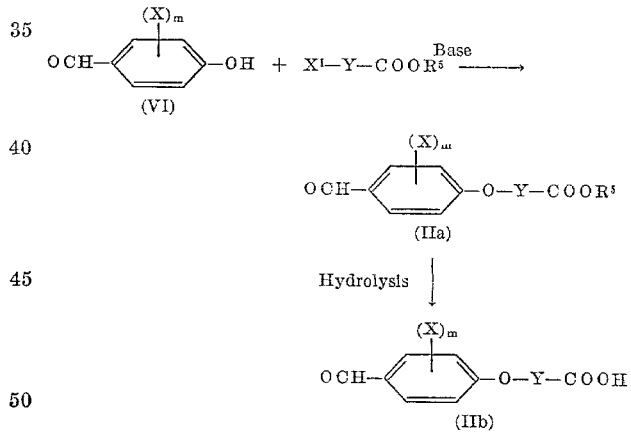

wherein $X^1$ is halogen; Y is methylene or trimethylene and $R^5$, X and $m$ are as defined above. The choice of a suitable solvent for the process is dependent largely upon the character of the reactants employed but, in general, any solvent which is substantially inert to the reactants and in which the reagents are reasonably soluble may be used. Ethanol, acetone and dimethylformamide have proved to be particularly advantageous mediums in which to conduct the synthesis.

The (4-formylphenoxy)alkanoic acid starting materials (IIb) may be prepared by still another etherification reaction similar to that described in the preceding paragraph; however, in lieu of employing an haloalkanoic acid ester reactant as described in the preceding synthesis the instant process employs the alkali metal or alkaline earth metal salt of an haloalkanoic acid having the formula $X^1$—Y—COOM wherein M is the cation derived from an alkali metal or alkaline earth metal hydroxide or carbonate, etc. and $X^1$ and Y are as defined above. As in the preceding etherification synthesis, the reaction is conducted in the presence of a base such as an aqueous solution of sodium or potassium carbonate or in the presence of a corresponding hydroxide or in the presence of a sodium alcoholate and the alkanoic acid salt thus obtained is then converted to the desired (4-formylphenoxy)alkanoic acid in the conventional manner by treatment with an acid such as hydrochloric acid. The following equation illustrates this method of preparation:

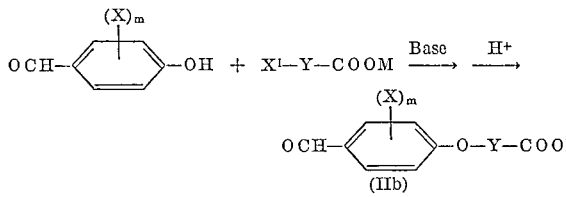
(IIb)

wherein H⁺ is the cation derived from an organic or inorganic acid such as hydrochloric acid and X, X¹, Y, M and m are as defined above. The etherification reaction may be conducted in any solvent in which the reagents are reasonably soluble such as ethanol and dimethylformamide. Also, the reaction may be conducted at ambient temperatures but, generally, it is desirable to conduct the reaction with slight heating.

Those (4-formylphenoxy)alkanoic acids and corresponding esters wherein the alkylene chain between the carboxy and oxygen moieties contains two linear carbon atoms are prepared from their corresponding nuclear hydroxy substituted benzaldehyde precursors (VII) by the reaction of the latter with propiolactone or with an appropriately substituted propiolactone in the presence of a base such as an aqueous solution of sodium hydroxide, preferably, while heating the solution at reflux temperatures; followed by the acidification of the carboxylate intermediate (VIII, infra) thus formed to yield the corresponding (4-formylphenoxy)alkanoic acid (IIc, infra); and, if desired, converting the said acid to the corresponding ester derivative (IId, infra) by treatment with an alkanol in the presence of a suitable acid such as hydrochloric acid, p-toluenesulfonic acid, etc. The following equation illustrates this method of preparation:

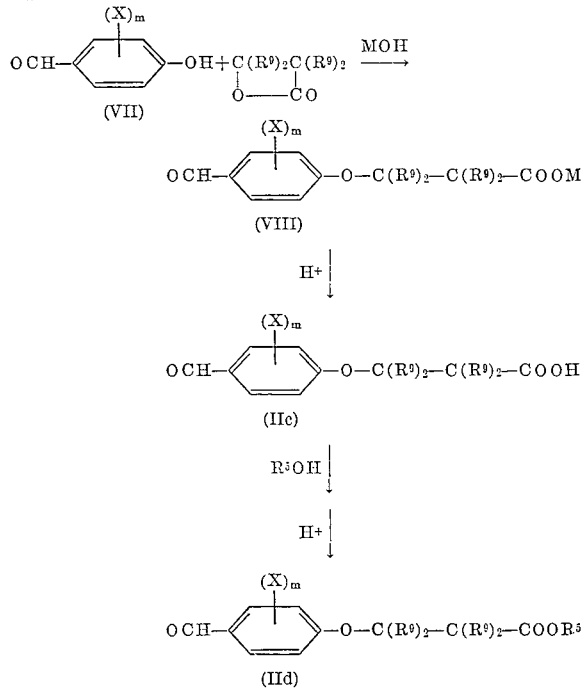

wherein R⁹ is hydrogen or lower alkyl, for example, methyl, etc. and R⁵, X, m and H⁺ are as defined above.

The formylation process (b) for preparing the (4-formylphenoxy)alkanoic acid reactants and their corresponding ester derivatives consists in treating an appropriate phenoxyalkanoic acid ester (IX, infra) with formaldehyde and concentrated hydrochloric acid to obtain a 4-chloromethyl substituted phenoxyalkanoic acid ester (X, infra), and the ester intermediate thus obtained is then treated with hexamethylenetetramine and concentrated hydrochloric acid under reflux to yield the corresponding (4-formylphenoxy)alkanoic acid ester (IIe) which may either be isolated for use as a reactant or may be hydrolyzed by treatment with a base and then with an acid to yield the corresponding (4-formylphenoxy)alkanoic acid (IIf). The following equation illustrates this method of preparation:

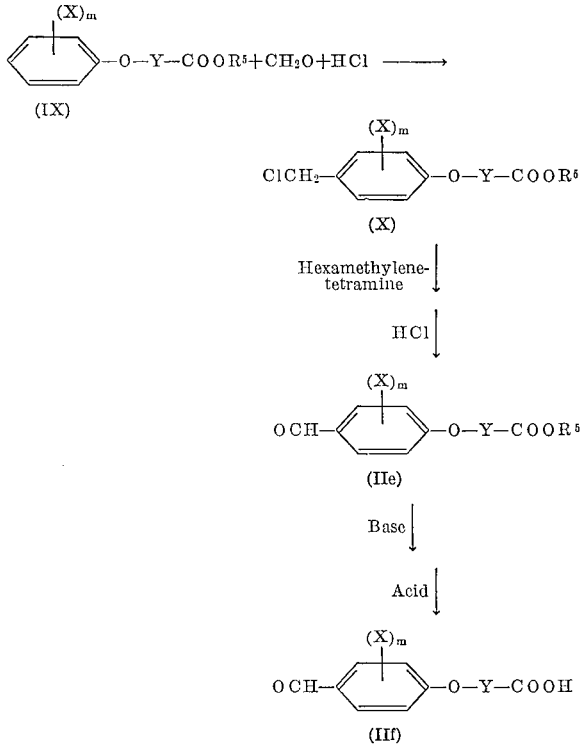

wherein R⁵, X, Y and m are as defined above.

The 4-hydroxybenzaldehydes (VII) which are employed as intermediates in the foregoing etherification syntheses are either known compounds or may be prepared by methods which are known to those skilled in the art. Thus, for example, by treating a phenol or an appropriately substituted derivative thereof with chloroform in the presence of an aqueous solution of a base and then treating the resulting mixture with an acid such as hydrochloric acid, the corresponding nuclear hydroxy substituted benzaldehyde may be obtained. Alternatively, the said 4-hydroxybenzaldehyde intermediates (VII) may also be obtained by the reaction of a phenol, or an appropriate nuclear substituted derivative thereof, with hydrogen cyanide or zinc cyanide and hydrogen chloride (gas) in the presence of anhydrous aluminum chloride. This reaction is preferably conducted in an inert solvent as, for example, in a benzene solution. The following equations illustrate these methods of preparation:

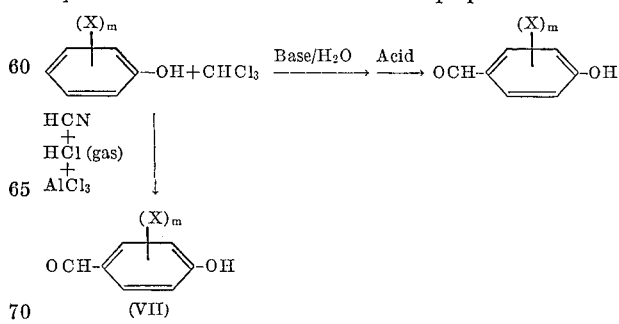

wherein X and m are as defined above.

Included within this invention are the nontoxic, pharmacologically acceptable salts of the instant products (I). Any base which will form an acid addition salt with the [4-(1-alkenyl)phenoxy]alkanoic acids (I) and whose pharmacological properties will not cause an adverse physiological effect in the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

This invention also relates to the preparation of ester and amide derivatives of the instant products (I) and includes all such derivatives as are compatible with the body system and whose pharmacological properties will not cause an adverse physiological effect. The said esters can be prepared insitu according to either of the two principal methods described above for the synthesis of the instant products or, if desired, the ester derivatives and, also, the corresponding amides may be synthesized from the corresponding [4-(1-alkenyl)phenoxy]alkanoic acid (I) by treatment with a suitable alkanol, ammonia, monoalkylamine or dialkylamine. Suitable esters and amides include, for example, the alkyl ester, the amide, monoalkylamide, and dialkylamide, etc.

The foregoing and other equivalent methods for the preparation of the salts, esters and amide derivatives of the instant products (I) will be apparent to those having ordinary skill in the art and, to the extent that the said derivatives are both nontoxic and physiologically acceptable to the body system, the said esters and amides are the functional equivalent of their corresponding [4-(1-alkenyl)-phenoxy]alkanoic acids (I).

The examples which follow illustrate the [4-(1-alkenyl) phenoxy]alkanoic acids (I) of the invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

{2,3-dichloro-4-[2,2-di-(methanesulfonyl)vinyl]phenoxy} acetic acid

Step A: Ethyl (2,3-dichloro-4-formylphenoxy)acetate.—A mixture of 2,3-dichloro-4-hydroxybenzaldehyde (708 g., 0.37 mole), potassium carbonate (112 g., 0.81 mole), ethyl bromoacetate (135 g., 0.81 mole) and dimethylformamide (285 ml.) is stirred and heated at 55–60° C. for 1.5 hours. The reaction mixture then is cooled in an ice bath and water (900 ml.) is added. The crystalline product which separates is collected on a filter and washed with water. Recrystallization from cyclohexane gives 97 g. (95%) of ethyl (2,3-dichloro - 4 - formylphenoxy)acetate, M.P. 89.5–91.5° C. After two more recrystallizations from cyclohexane the ethyl (2,3-dichloro-4-formylphenoxy)acetate 87.3 g. (85%) melts at 92–93° C.

Analysis.—Calculated for $C_{11}H_{10}Cl_2O_4$ (percent): C, 47.68; H, 3.64; Cl, 25.59. Found (percent): C, 47.67; H, 3.58; Cl, 25.40.

Step B: Ethyl {2,3-dichloro - 4 - [2,2-di-(methanesulfonyl)vinyl]phenoxy}acetic acid. In a 100 ml. flask fitted with a constant water separator and flushed with nitrogen is placed ethyl (2,3-dichloro-4-formylphenoxy)acetate (2.77 g., 0.01 mole), bis(methylsulfonyl)methane (5.16 g., 0.03 mole), piperidine acetate (100 mg.) and toluene (50 ml.). The reaction is heated at reflux for 5.5 hours, cooled to 35° C. and filtered from the excess bis(methylsulfonyl) methane which precipitates. Upon further cooling there is collected 1.4 g. (33%) of ethyl {2,3-dichloro-4-[2,2 - di - (methanesulfonyl)vinyl]phenoxy}acetic acid which melts at 144–146° C. following recrystallization from toluene.

Analysis.—Calculated for $C_{14}H_{16}Cl_2O_7S_2$ (percent): C, 38.99; H, 3.74; S, 14.87. Found (percent): C, 39.28; H, 3.76; S, 14.97.

Step C: {2,3-dichloro - 4 - [2,2-di-(methanesulfonyl)-vinyl]phenoxy}acetic acid.—Ethyl {2,3-dichloro - 4 - [2,2-di-(methanesulfonyl)vinyl]phenoxy}acetic acid (2.7 g., .0063 mole) is dissolved in a solution of acetic acid (10 ml.) and 5% aqueous hydrochloric acid (5 ml.) and heated on a steam bath for 40 minutes. The solution then is cooled and treated with water (15 ml.) to give 1.5 g. (60%) of {2,3-dichloro - 4 - [2,2-di-(methanesulfonyl)-vinyl]phenoxy}acetic acid which melts at 217–219° C. following recrystallization from a mixture of ethyl acetate (25 ml.) and hexane (50 ml.).

Analysis.—Calculated for $C_{12}H_{12}Cl_2O_7S_2$ (percent): C, 35.74; H, 3.00; S, 15.90. Found (percent): C, 35.84; H, 3.02; S, 16.01.

EXAMPLE 2

[3-chloro-4-(2,2-dicyanovinyl)phenoxy]acetic acid

Step A: (3-chloro-4-formylphenoxy)acetic acid.—A solution of 2-chloro - 4 - hydroxybenzaldehyde (15.0 g., 0.096 mole) in a 1,2-dimethoxyethane (50 ml.) is added to a suspension of sodium hydride (2.9 g., 0.12 mole) in 1,2-dimethoxyethane (35 ml.). Ethyl bromoacetate (20.0 g., 0.12 mole) then is added dropwise during 20 minutes with stirring. The mixture is stirred and refluxed for one hour. The precipitated sodium bromide is filtered off and the solvent is distilled in vacuo leaving ethyl (3-chloro-4-formylphenoxy)acetate as a residual oil.

To the residual ethyl (3-chloro-4-formylphenoxy acetate, ethanol (40 ml.) and 10% sodium hydroxide solution (100 ml.) are added and the resulting solution is heated 10 minutes on the steam bath. The solution then is acidified with concentrated hydrochloric acid to precipitate the product, which is recrystallized from aqueous acetic acid to yield 15.5 g. (78%) of (3-chloro-4-formylphenoxy)acetic acid, M.P. 174–176.5° C.

Analysis.—Calculated for $C_9H_7ClO_4$ (percent): C, 50.37; H, 3.29. Found (percent): C, 50.39; H, 3.47.

Step B: [3-chloro-4-(2,2-dicyanovinyl)phenoxy]acetic acid.—A mixture of (3-chloro-4-formylphenoxy)acetic acid (5.15 g., 0.024 mole), malononitrile (1.90 g., 0.0288 mole), acetic acid (2.30 g., 0.0384 mole), benzene (10 ml.) and ammonium acetate (0.075 g.) is heated under reflux, under a constant water separator, until the evolution of water ceases (approximately 1.5 hours).

The reaction mixture is cooled and the resulting yellow solid is collected and dried to yield 6.30 g. of product, M.P. 165–170° C. Recrystallization from isopropyl alcohol yields 5.24 g. (83.2%) of [3-chloro-4-(2,2-dicyanovinyl)phenoxy]acetic acid in the form of yellow needles, M.P. 170–171° C. Further purification by recrystallization from acetic acid yields pure [3-chloro-4-(2,2-dicyanovinyl)phenoxy]acetic acid melting at 173–174° C.

Analysis.—Calculated for $C_{12}H_7ClN_2O_3$ (percent): C, 54.87; H, 2.69; N, 10.67. Found (percent): C, 54.62; H, 2.98; N, 10.46.

EXAMPLE 3

[2,3-dichloro-4-(2,2-dicyanovinyl)phenoxy]acetic acid

Step A: (2,3-dichloro-4-formylphenoxy)acetic acid.—A solution of ethyl (2,3-dichloro-4-formylphenoxy)-acetate (50 g., 0.151 mole) and sodium bicarbonate (25.5 g., 0.3 mole) in ethanol (450 ml.) and water (900 ml.) is heated two hours on a steam bath and the solution then is cooled. The sodium salt of the product which precipitates is collected by filtration, dissolved in boiling water (1500 ml.) and the solution acidified with concentrated hydrochloric acid to precipitate 40 g. (94%) of (2,3-dichloro-4-formylphenoxy)acetic acid, M.P. 204–210° C. Recrystallization from acetonitrile gives pure (2,3-dichloro-4-formylphenoxy)acetic acid, M.P. 210–212° C.

Analysis.—Calculated for $C_9H_6Cl_2O_4$ (percent): C, 43.40; H, 2.43; Cl, 28.47. Found (percent): C, 43.22; H, 2.69; Cl, 28.28.

Step B: [2,3-dichloro-4-(2,2-dicyanovinyl)phenoxy]-acetic acid.—A mixture of (2,3-dichloro - 4 - formylphenoxy)acetic acid (4.98 g., 0.02 mole), malononitrile (1.58 g., 0.024 mole), acetic acid (1.92 g., 0.032 mole), benzene (8 ml.) and ammonium acetate (0.060 g.) is heated under reflux, under a constant water separator, until the evolution of water ceases (approximately 1.5 hours).

The reaction mixture is cooled and the resulting yellow solid is collected and dried to yield 5.61 g. of [2,3-dichloro - 4 - (2,2-dicyanovinyl)phenoxy]acetic acid, M.P. 163–172° C. Recrystallization from acetic acid gives 5.0 g. (84.2%) of [2,3-dichloro - 4 - (2,2-dicyanovinyl)phenoxy]acetic acid in the form of yellow needles, M.P. 178.5–179.5° C.

*Analysis.*—Calculated for $C_{12}H_6Cl_2N_2O_3$ (percent): C, 48.51; H, 2.04; N, 9.43. Found (percent): C, 48.56; H, 2.28; N, 9.45.

EXAMPLE 4

{2,3-dichloro-4-[1-(dicyanomethylene)ethyl]phenoxy} acetic acid

Step A: Ethyl {2,3-dichloro-4-[1-(dicyanomethylene)-ethyl]phenoxy}acetate.—Ammonium acetate (0.60 g.) is added in 150 mg. portions at three-hour intervals to ethyl (2,3-dichloro - 4 - acetylphenoxy)acetate (14.56 g., 0.05 mole), malononitrile (3.96 g., 0.06 mole), acetic acid (4.80 g., 0.08 mole), benzene (20 ml.) and the mixture is heated under reflux under a constant water separator until the evolution of water ceases (approximately 14 hours).

The volatile materials are removed under reduced pressure and the residue is fractionally distilled. There is thus obtained 3.73 g. (22%) of ethyl {2,3-dichloro-4-[1-(dicyanomethylene)ethyl]phenoxy}acetate, B.P. 175–200° C./0.05 mm., in the form of a viscous liquid. This material is used in the next step without further purification.

Step B: {2,3-dichloro-4-[1-(dicyanomethylene)ethyl]-phenoxy}acetic acid.—A solution of ethyl {2,3-dichloro-4-[1-(dicyanomethylene)ethyl]phenoxy}acetate (7.23 g., 0.0213 mole) in acetic acid (50 ml.), containing concentrated hydrochloric acid (2 ml.), is treated with water (36 ml.) and the resulting solution is heated under reflux for 30 minutes.

The volatile materials are removed under reduced pressure, the residue is suspended in water (50 ml.) and the pH is adjusted to 7.0–7.5 by the addition of a 5% sodium hydroxide solution. The mixture is extracted with chloroform to remove a trace of ester and the clear aqueous solution is then made acid to Congo red paper by the addition of 6 N hydrochloric acid. There is thus obtained 5.86 g. of {2,3-dichloro-4-[1-(dicyanomethylene)ethyl]-phenoxy}acetic acid, M.P. 140–150° C. which is purified by dissolving the product in aqueous sodium bicarbonate solution, filtering and treating with dilute hydrochloric acid. Further purification by recrystallization from a mixture of acetic acid and water yields 3.88 g. (60%) of needles, M.P. 164.5–165.5° C.

*Analysis.*—Calculated for $C_{13}H_8Cl_2N_2O_3$ (percent): C, 50.18; H, 2.59; N, 9.00. Found (percent): C, 50.04; H, 2.75; N, 8.79.

EXAMPLE 5

[2,3-dichloro-4-(2-carboxy-2-cyanovinyl)phenoxy]-acetic acid

A solution of cyanoacetic acid (1.52 g., 0.01 mole) in water (20 ml.) is neutralized with 5% sodium hydroxide and added to a vigorously stirred solution of ethyl (2,3-dichloro - 4 - formylphenoxy)acetate (2.77 g., 0.01 mole) in 80% aqueous ethanol (120 ml.). The mixture is treated with 5% sodium hydroxide (10 ml.), stirred for two minutes and acidified with hydrochloric acid. The [2,3-dichloro - 4 - (2-carboxy - 2 - cyanovinyl)phenoxy]acetic acid which separates (2.4 g., 76%) melts at 263–265° C. and is recrystallized from ethanol to yield a pure product.

*Analysis.*—Calculated for $C_{12}H_7Cl_2NO_5$ (percent): C, 45.59; H, 2.23; N, 4.43. Found (percent): C, 45.42; H, 2.29; N, 4.44.

EXAMPLE 6

{2,3-dichloro-4-[2,2-bis-(ethoxycarbonyl)vinyl]phenoxy} acetic acid

A mixture of (2,3-dichloro - 4 - formylphenoxy)acetic acid (4.98 g., 0.02 mole), diethyl malonate (3.84 g., 0.024 mole), acetic acid (1.92 g., 0.032 mole), toluene (8 ml.) and ammonium acetate (0.060 g.) is heated under reflux, under a constant water separator until the evolution of water ceases (approximately four hours).

The volatile materials are removed under reduced pressure and the residue is purified by recrystallization from butyl chloride to yield 4.10 g. (52%) of {2,3-dichloro-4-[2,2-bis-(ethoxycarbonyl)vinyl]phenoxy}acetic acid in the form of white prisms, M.P. 127–130° C.

*Analysis.*—Calculated for $C_{16}H_{16}Cl_2O_7$ (percent): C, 49.12; H, 4.12; Cl, 18.13. Found (percent): C, 48.82; H, 4.24; Cl, 18.20.

EXAMPLE 7

[2,3-dichloro-4-(2-cyano-2-sulfamoylvinyl)phenoxy]-acetic acid

A mixture of (2,3-dichloro-4-formylphenoxy)acetic acid (4.98 g., 0.02 mole), 1-cyanomethanesulfonamide (2.88 g., 0.024 mole), acetic acid (10 ml.), toluene (40 ml.) and ammonium acetate (0.060 g.) is heated under reflux, under a constant water separator, until the evolution of water ceases (approximately two hours).

The reaction mixture is cooled and the resulting yellow solid is collected and dried to yield 6.97 g. of 1-cyano-2 - [2,3 - dichloro - 4-(carboxymethoxy)phenyl]ethenesulfonamide, M.P. 210–221° C. Recrystallization from acetic acid gives 4.36 g. (62%) of [2,3-dichloro-4-(2-cyano-2-sulfamoylvinyl)phenoxy]acetic acid in the form of white rods, M.P. 229–232.5° C. Further recrystallization from acetic acid gives purified product melting at 232–235° C.

*Analysis.*—Calculated for $C_{11}H_8Cl_2N_2O_5S$ (percent): C, 37.62; H, 2.30; N, 7.98. Found (percent): C, 37.90; H, 2.54; N, 7.85.

EXAMPLE 8

[2,3-dichloro-4-(2-benzenesulfonyl-3-oxo-1-butenyl)-phenoxy]acetic acid

Step A: Ethyl [2,3 - dichloro-4-(2-benzenesulfonyl-3-oxo-1-butenyl)phenyl]acetate.—In a 100 ml. flask fitted with a constant water separator and flushed with nitrogen is placed ethyl (2,3-dichloro-4-formylphenoxy)acetate (2.77 g., 0.01 mole), benzenesulfonyl acetone (1.98 g., 0.01 mole), toluene (50 ml.) and piperidine acetate (100 mg.). The reaction mixture is heated at reflux for 2.5 hours, cooled and then filtered and dried to yield 2.8 g. (61%) of ethyl [2,3-dichloro-4-(2-benzenesulfonyl-3-oxo-1-butenyl)phenoxy]acetate which melts at 155–156° C. following recrystallization from toluene.

*Analysis.*—Calculated for $C_{20}H_{18}Cl_2O_6S$ (percent): C, 52.52; H, 3.97; S, 7.01. Found (percent): C, 52.75; H, 3.98; S, 7.03.

Step B: [2,3 - dichloro - 4-(2-benzenesulfonyl-3-oxo-1-butenyl)phenoxy]acetic acid.—Ethyl [2,3-dichloro-4-(2-benzenesulfonyl-3-oxo-1-butenyl)phenoxy]acetate (2.4 g., 0.00525 mole) is dissolved in a mixture of acetic acid (15 ml.) and 5% hydrochloric acid (5 ml.), heated on a steam bath for 40 minutes and then cooled. The 2.0 g. of [2,3 - dichloro - 4-(2 - benzenesulfonyl-3-oxo-1-butenyl)-phenoxy]acetic acid (89%) which separates melts at 200–201° C. following recrystallization from a mixture of ethyl acetate and hexane.

*Analysis.*—Calculated for $C_{18}H_{14}Cl_2O_6S$ (percent): C, 50.36; H, 3.29; S, 7.47. Found (percent): C, 50.56; H, 3.49; S, 7.36.

EXAMPLE 9

[2,3-dichloro-4-(2-carbamoyl-2-cyanovinyl)-phenoxy]acetic acid

A 100 ml. round-bottomed flask is fitted with a Dean-Stark constant water separator and reflux condenser and is charged with (2,3-dichloro-4-formylphenoxy)acetic acid (4.98 g., 0.02 mole), cyanoacetamide (2.00 g., 0.024 mole), toluene (50 ml.), acetic acid (10 ml.) and ammonium acetate (100 mg.). The reaction mixture is then stirred and heated at reflux for two hours, during which time the requisite amount of water is collected. The [2,3-dichloro - 4 - (2-carbamoyl-2-cyanovinyl)phenoxy]acetic acid thus obtained separates in quantitative yield and melts at 263–265° C. following recrystallization from acetic acid (250 ml.).

Analysis.—Calculated for $C_{17}H_8Cl_2N_2O_4$ (percent): C, 45.72; H, 2.56; N, 8.89. Found (percent): C, 45.62; H, 2.52; N, 8.78.

EXAMPLE 10

[2,3-dichloro-4-(2-carbethoxy-2-carbamoylvinyl)-phenoxy]acetic acid

A 200 ml. round-bottomed flask is fitted with a Dean-Stark constant water separator and reflux condenser and is charged with (2,3-dichloro-4-formylphenoxy)acetic acid (4.98 g., 0.02 mole), ethyl malonamate (3.15 g., 0.024 mole), toluene (100 ml.), acetic acid (10 ml.) and ammonium acetate (100 mg.). The reaction mixture is then stirred and heated at reflux for four hours during which time the requisite amount of water is collected. The [2,3-dichloro - 4 - (2-carbethoxy-2-carbamoylvinyl)phenoxy]-acetic acid thus obtained separates in quantitative yield and melts at 210–212° C. Upon recrystallization from methanol the product melts at 216 C.

Analysis.—Calculated for $C_{14}H_{13}Cl_2NO_6$ (percent): C, 46.43; H, 3.62. Found (percent): C, 45.46; H, 3.78.

EXAMPLE 11

[2,3-dichloro-4-(2-cyanovinyl)phenoxy]acetic acid

A solution of ethyl (2,3-dichloro-4-formylphenoxy)-acetate (5.54 g., 0.02 mole), (cyanomethylene)triphenylphosphorane (6.02 g., 0.02 mole) in benzene (100 ml.) is heated at reflux under a slow stream of nitrogen for five hours. The benzene is distilled at reduced pressure and the residue is extracted with boiling hexane (2×250 ml.) to yield 6.0 g. (100%) of ethyl [2,3-dichloro-4-(2-cyanovinyl)phenoxy]acetate. The ester product thus obtained is then hydrolyzed in a solution of 50% aqueous ethanol (400 ml.) containing sodium bicarbonate (3.4 g.) kept at reflux for one hour. Upon cooling the sodium salt of the [2,3-dichloro-4-(2-cyanovinyl)phenoxy]acetic acid separates, is filtered, dissolved in hot water (200 ml.) and acidified with dilute hydrochloric acid to yield 2.60 g. (48%) of [2,3-dichloro-4-(2-cyanovinyl)phenoxy]acetic acid which melts at 157–158° C. after recrystallization from benzene.

Analysis.—Calculated for $C_{11}H_7Cl_2NO_3$ (percent): C, 48.56; H, 2.59; N, 5.15. Found (percent): C, 49.13; H, 2.73; N, 5.04.

EXAMPLE 12

[2,3-dichloro-4-(2,2-dicarbamoylvinyl)phenoxy]-acetic acid

A 250 ml. round-bottomed flask is fitted with a Dean-Stark constant water separator and reflux condenser and is charged with (2,3-dichloro-4-formylphenoxy)acetic acid (4.98 g., 0.02 mole), malonamide (2.4 g., 0.0235 mole), toluene (150 ml.), acetic acid (15 ml.) and ammonium acetate (100 mg.). The stirred reaction mixture is then refluxed for 1.5 hours during which time the requisite amount of water separates.

The resulting crude product is filtered and recrystallized from acetic acid (175 ml.) to yield 3.6 g. (54%) of [2,3 - dichloro-4-(2,2-dicarbamoylvinyl)phenoxy]acetic acid. Upon recrystallization from acetic acid the [2,3-dichloro-4-(2,2-dicarbamoylvinyl)phenoxy]acetic acid melts at 270° C. dec.

Analysis.—Calculated for $C_{12}H_{10}Cl_2N_2O_5$ (percent): C, 43.26; H, 3.03; N, 8.41. Found (percent): C, 43.37; H, 2.95; N, 8.31.

EXAMPLE 13

3-[2,3-dichloro-4-(2,2-dicyanovinyl)phenoxy] propionic acid

Step A: 3-(2,3-dichloro-4-formylphenoxy)propionic acid.—2,3 - dichloro - 4 - hydroxybenzaldehyde (38.2 g., 0.2 mole) is dissolved in a 10% sodium hydroxide solution (200 ml.). The solution is heated to boiling and beta-propiolactone (144 g., 2.0 moles) is added dropwise at such a rate as to keep the solution boiling. During the addition a 10% sodium hydroxide solution is added in portions to maintain an alkaline mixture. The solution is then cooled and acidified and the precipitated material is dissolved in ether and the product extracted into a 5% sodium bicarbonate solution. Acidification of the aqueous solution precipitates 3-(2,3-dichloro-4-formylphenoxy) propionic acid, which is purified by recrystallization from ethyl acetate.

Step B: 3-[2,3-dichloro-4-(2,2-dicyanovinyl)phenoxy]-propionic acid.—By substituting 3 - (2,3 - dichloro - 4-formylphenoxy)propionic acid for the (3 - chloro - 4-formylphenoxy)acetic acid of Example 2 and following the procedure described therein the product 3-[2,3-dichloro - 4 - (2,2 - dicyanovinyl)phenoxy]propionic acid is obtained.

EXAMPLE 14

{2,3-dimethyl-4-[2,2-bis-(ethoxycarbonyl)vinyl] phenoxy}acetic acid

Step A: Ethyl (2,3-dimethylphenoxy)acetate.—A 500 ml. round-bottom flask is charged with 2,3-dimethylphenol (78 g., 0.64 mole), dimethylformamide (450 ml.), anhydrous potassium carbonate (195 g., 1.4 mole) and ethyl bromoacetate (225 g., 1.34 mole). The stirred reaction mixture is heated at 60–65° C. in a water bath for 45 minutes and then poured into 1.5 liters of ice water. The product is extracted with ether (500 ml.), washed with three 500 ml. portions of water and dried over magnesium sulfate. The ether is distilled at reduced pressure and the product fractionated to give 86 g. (65%) of ethyl (2,3-dimethyl-4-formylphenoxy)acetate, B.P. 153–155° C./15 mm. The product is used in the next step without further purification.

Step B: Ethyl{2,3 - dimethyl - 4 - [2,2 - bis - (ethoxycarbonyl) - vinyl]phenoxy}acetic acid.—By substituting ethyl (2,3 - dimethyl - 4 - formylphenoxy)acetate and diethylmalonate for the ethyl (2,3 - dichloro - 4 - acetylphenoxy)acetate and malononitrile recited in Example 4, Step A, and following the procedure described therein the product ethyl {2,3 - dimethyl - 4 - [2,2 - bis - (ethoxycarbonyl)vinyl]phenoxy}acetic acid is obtained.

Step C: {2,3 - dimethyl - 4 - [2,2 - bis - (ethoxycarbonyl)vinyl]phenoxy}acetic acid.—By substituting ethyl {2,3 - dimethyl - 4 - [2,2 - bis - (ethoxycarbonyl)vinyl] phenoxy}acetic acid for the ethyl {2,3 - dichloro - 4 - [1-(dicyanomethylene)ethyl]phenoxy}acetate recited in Example 4, Step B, and following the procedure described therein the product {2,3 - dimethyl - 4 - [2,2 - bis-(ethoxycarbonyl)vinyl]phenoxy}acetic acid is obtained.

EXAMPLE 15

2-[2,3-dichloro-4-(2-cyano-2-ethoxycarbonylvinyl) phenoxy]propionic acid

Step A: Ethyl 2 - (2,3 - dichloro - 4 - formylphenoxy) propionate.—A mixture of 2,3 - dichloro - 4 - hydroxybenzaldehyde (Example 1, Step A) (5.0 g., 0.026 mole), ethyl α-bromopropionate (9.2 g., 0.051 mole), potassium carbonate (5.2 g., 0.038 mole) and dimethylformamide (25 ml.) is stirred and heated at 55–60° C. for 16 hours.

The mixture is diluted with water and the solid that separates is recrystallized from cyclohexane to obtain 4.6 g. (61%) of ethyl 2 - (2,3 - dichloro - 4 - formylphenoxy) propionate, M.P. 67.5–68.5° C.

*Analysis.*—Calculated for $C_{12}H_{12}Cl_2O_4$ (percent): C, 49.51; H, 4.15; Cl, 24.36. Found (percent): C, 49.97; H, 4.57; Cl, 23.78.

Step B: Ethyl 2 - [2,3 - dichloro - 4 - (2 - cyano - 2-ethoxycarbonylvinyl)phenoxy]propionate.—By substituting ethyl 2 - (2,3 - dichloro - 4 - formylphenoxy)propionate and ethyl cyanoacetate for the ethyl (2,3 - dichloro - 4 - acetylphenoxy)acetate and malononitrile recited in Example 4, Step A, and following the procedure described therein the product ethyl 2 - [2,3 - dichloro-4 - (2 - cyano - 2 - ethoxycarbonylvinyl)phenoxy]propionate is obtained.

Step C: 2 - [2,3 - dichloro - 4 - (2 - cyano - 2 - ethoxycarbonylvinyl)phenoxy]propionic acid.—By substituting ethyl 2 - [2,3 - dichloro - 4 - (2 - cyano - 2 - ethoxycarbonylvinyl)phenoxy]propionate for the ethyl {2,3-dichloro - 4 - [1 - dicyanomethylene)ethyl]phenoxy}acetate recited in Example 4, Step B, and following the procedure described therein the product 2 - [2,3 - dichloro - 4 - (2-cyano 2 - ethoxycarbonylvinyl)phenoxy]propionic acid is obtained.

EXAMPLE 16

[4-(2,2-dicyanovinyl)-1-naphthyloxy]acetic acid

Step A: Ethyl (4 - formyl - 1 - naphthyloxy)acetate.—A mixture of 4 - formyl - 1 - naphthol (13 g., 0.075 mole), potassium carbonate (15 g., 0.15 mole), ethyl bromoacetate (25 g., 0.15 mole) and dimethylformamide (75 ml.) is stirred and heated at 55–60° C. for one hour. The mixture then is cooled and treated with water (500 ml.) and the precipitated product recrystallized from ethanol to yield 13.2 g. (68%) of ethyl (4-formyl-1-naphthyloxy)acetate, M.P. 99–100° C. After two recrystallizations from ethanol the melting point of the product is 100–101.5° C.

*Analysis.*—Calculated for $C_{15}H_{14}O_4$ (percent): C, 69.75; H, 5.46. Found (percent): C, 69.18; H, 5.58.

Step B: Ethyl [4 - (2,2 - dicyanovinyl) - 1 - naphthyloxy]acetate.—By substituting ethyl (4 - formyl - 1 - naphthyloxy)acetate for the ethyl (2,3 - dichloro - 4 - acetylphenoxy)acetate recited in Example 4, Step A, and following the procedure described therein the product ethyl [4 - (2,2 - dicyanovinyl) - 1 - naphthyloxy]acetate is obtained.

Step C: [4 - (2,2 - dicyanovinyl) - 1 - naphthyloxy] acetic acid.—By substituting ethyl {4 - [1 - (dicyanomethylene)ethyl] - 1 - naphthyloxy}acetate for the ethyl {2,3-dichloro - 4 - [1 - (dicyanomethylene)ethyl]phenoxy} acetate recited in Example 4, Step B, and following the procedure described therein the product [4 - (2,2 - dicyanovinyl)-1-naphthyloxy]acetic acid is obtained.

In a manner similar to that described in Example 1 for the preparation of {2,3 - dichloro - 4 - [2,2 - di - (methanesulfonyl)vinyl]phenoxy}acetic acid all of the products of this invention may be obtained. Thus, by substituting the appropriate 4-hydroxybenzaldehyde, alkyl haloalkanoate and disubstituted methylene reactant for the 2,3-dichloro - 4 - hydroxybenzaldehyde, ethyl bromoacetate and bis - (methylsulfonyl)methane recited in Example 1, Steps A and B and following the procedure described in Steps A–C of that example all of the [4 - (1 - alkenyl) phenoxy]alkanoic acid products of this invention may be synthesized. The following equation illustrates the reaction of Example 1, Steps A–C and, together with Table I, depict the starting materials of the instant process and the products (Id) derived therefrom:

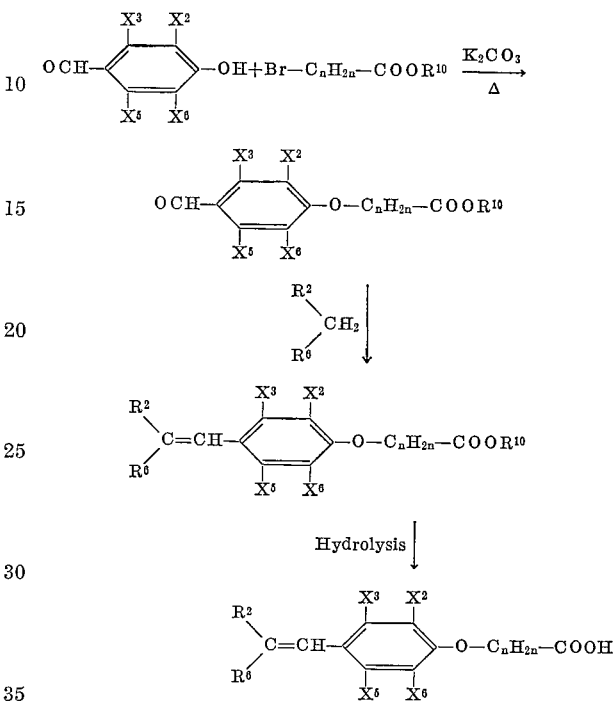

TABLE I

| Ex. | R² | R⁶ | R¹⁰ | X² | X³ | X⁵ | X⁶ | —$C_nH_{2n}$— |
|---|---|---|---|---|---|---|---|---|
| 17 | —CN | —CN | —CH₃ | H | Br | H | H | —CH₂— |
| 18 | —COOC₂H₅ | —COOC₂H₅ | —C₂H₅ | —CH₃ | H | H | —CH₃ | —CH₂— |
| 19 | —COCH₃ | —SO₂—⟨ ⟩ | —CH₃ | H | Cl | H | H | —(CH₂)₃— |
| 20 | —CN | —CN | —C₂H₅ | —CH₃ | —CH₃ | —CH₃ | —CH₃ | —CHCH₃— |
| 21 | —COOC₂H₅ | —CN | —CH₃ | H | F | H | H | —CH₂— |
| 22 | —CN | —CONH₂ | —CH₃ | —(CH₂)₄— | —CH₃ | —CH₃ | H | —(CH₂)₃— |
| 23 | —COOC₂H₅ | —CONH₂ | —C₂H₅ | H | —(CH₂)₄— | H | H | —CH₂— |

The products (I) of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a [4-(1-alkenyl)-phenoxy]alkanoic acid or a suitable acid addition salt, lower alkyl ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 24

Dry-filled capsules containing 50 mg. of active ingredient per capsule

|  | Per capsule, mg. |
|---|---|
| [2,3-dichloro-4-(2-cyanovinyl)-phenoxy]acetic acid | 50 |
| Lactose | 144 |
| Magnesium stearate | 6 |
| Capsule size No. 3 | 200 |

The [2,3-dichloro-4-(2-cyanovinyl)phenoxy]acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the [4-(1-alkenyl)phenoxy]alkanoic acid products of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:
1. A compound having the formula:

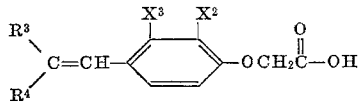

wherein $R^3$ is hydrogen, cyano or lower alkoxycarbonyl and $R^4$ is cyano and $X^2$ and $X^3$ are halogen or the non-toxic, pharmacologically acceptable salts, lower alkyl esters, primary amide, lower alkylamides or di-lower alkylamides of the carboxylic acid compounds.

2. The compound of claim 1 wherein $R^3$ is hydrogen.
3. The compound of claim 1 wherein $R^3$ is cyano.
4. The compound of claim 1 wherein $R^3$ is hydrogen and $X^2$ and $X^3$ are chloro.
5. The compound of claim 1 wherein $R^3$ is cyano and $X^2$ and $X^3$ are chloro.
6. A compound of the formula:

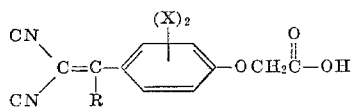

wherein R is lower alkyl; and X is halogen, or the non-toxic, pharmacologically acceptable salts, lower alkyl esters, primary amide, lower alkylamides or di-lower alkylamides of the carboxylic acid compounds.

References Cited

UNITED STATES PATENTS

| 2,649,471 | 8/1953 | Williams et al. | 260—465 |
| 3,081,280 | 3/1963 | Carlson | 260—465 X |
| 3,085,097 | 4/1963 | Strobel et al. | 260—465 X |
| 3,149,146 | 9/1964 | Strobel et al. | 260—465 |
| 3,149,148 | 9/1964 | Kladko et al. | 260—465 |
| 3,256,312 | 6/1966 | Strobel et al. | 260—465 |
| 3,336,357 | 8/1967 | Strobel et al. | 260—465 |
| 3,462,475 | 8/1969 | Strobel et al. | 260—465 |

FOREIGN PATENTS

| 198,257 | 12/1957 | Austria | 260—465 |
| 1,023,945 | 1/1953 | France | 260—465 |

OTHER REFERENCES

Maercker, Organic Reactions, vol. 14, John Wiley & Sons, pp. 270, 271 and 332–335.

Jones, Organic Reactions, vol, 15, John Wiley & Sons, pp. 204–206, 223, 224 and 261–264.

CHARLES B. PARKER, Primary Examiner

D. H. TORRENCE, Assistant Examiner

U.S. Cl. X.R.

260—471 A, 473 A, 473 F, 473 G, 484 R, 482 R, 520, 521 A, 521 R, 556 AR, 559 B; 424—304, 308, 309, 311, 317, 321, 324